M. G. HUBBARD.
Harvester Gearing.
No. 99,439. Patented Feb. 1, 1870.
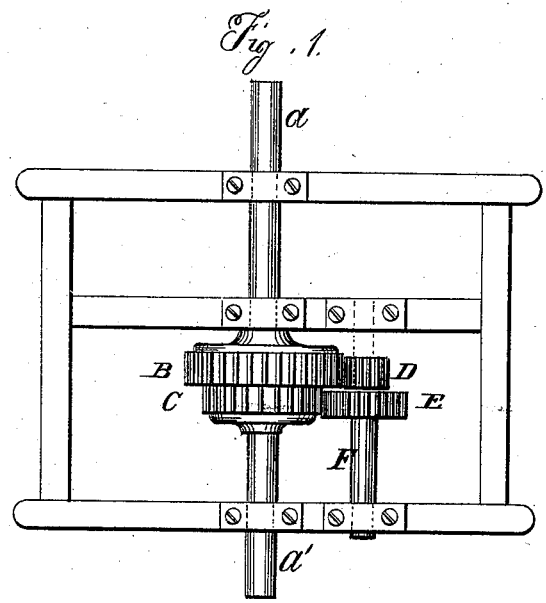
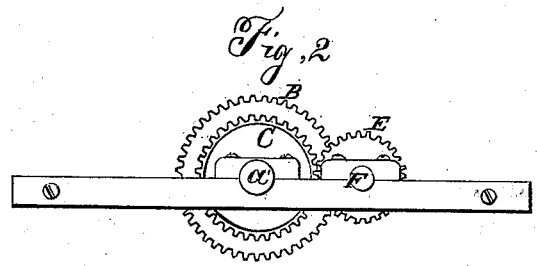
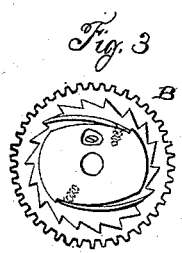
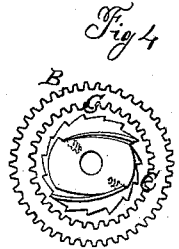
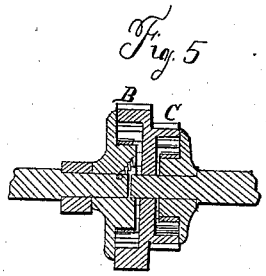
Witnesses
N B Smith
H H Doubleday
Inventor
M. G. Hubbard
by his Atty

UNITED STATES PATENT OFFICE.

M. G. HUBBARD, OF SYRACUSE, NEW YORK.

IMPROVED HARVESTER-GEARING FOR CHANGING SPEED.

Specification forming part of Letters Patent No. 99,439, dated February 1, 1870.

*To all whom it may concern:*

Be it known that I, MOSES G. HUBBARD, of Syracuse, in the county of Onondaga and State of New York, have invented certain new and useful Improvements in Changeable-Speed Harvester-Gearing; and I do hereby declare the following to be a full and clear description thereof, reference being had to the accompanying drawings, in which—

Figure 1 is a top view. Fig. 2 is a side view, and Figs. 3, 4, and 5 are views of detached parts.

In order to produce the changeable speed of the gearing, which experience has shown to be so essential for a successful and durable "mowing-machine," and which has been found to be quite as essential in "reaping-machines," I mount the main frame on two of my well-known improved skeleton driving-wheels attached to the outer ends of the divided shaft or axle at $a$ and $a'$. This shaft is divided, and its inner ends meet in a central journal-box, or in a sleeve extending from one of the central gear-wheels, and thus form a support for the two main gear-wheels B and C. These two main gear-wheels are so constructed that they may be attached together by bolts or otherwise, and on the inner side of the rim of each of said wheels is formed a circle of ratchets, as shown detached in Figs. 3 and 4, which are side views of the two main gear-wheels B and C. On the inner ends of the divided shaft are attached ratchet-hubs of ordinary form, and which support ordinary elastic pawls, which snap into the ratchets on the insides of the main gear-wheels, one of these ratchet-hubs being larger than the other and working in the inside of the larger main gear-wheel, B, and the smaller ratchet-hub working in the inside of the smaller main gear-wheel, C. This ratchet-connection enables both of the driving-wheels to drive the gearing, and yet leaves them independent in turning corners, similar to other ratcheted double driving-wheel machines, except that by locating several pawls on each hub, so that only one pawl on each hub will engage at the same time, as fully shown and described in a patent issued to me November 29, 1864, a very valuable result is attained in making both wheels practically continuous drivers, and thus a changeable-speed continuous double drive-wheel harvester is practically secured. The two pinions D and E are so arranged that either one of them may be clutched to or unclutched from the shaft F by a common device, which it is unnecessary to more fully describe. By this arrangement it will be seen that when the smaller pinion is clutched to the shaft F a higher speed will be imparted to said shaft than when the larger pinion is clutched thereto, and the other ordinary gearing of a harvester being attached to and driven by said shaft the speed of vibrations of the cutters can be varied as the kind or condition of the crop may require.

What I claim as new, and desire to secure by Letters Patent, is—

1. The combination of the two main gear-wheels, of unequal size, with the two ratchet-hubs of corresponding size, arranged substantially as and for the purposes described.

2. The combination of the above-described changeable-speed device with the divided shaft arranged for the attachment of the double continuous driving-wheels, substantially in the manner and for the purposes set forth.

M. G. HUBBARD.

Witnesses:
   K. R. ROGERS,
   E. LEWIS.